United States Patent

[11] 3,544,727

[72] Inventors William W. Sloan Concord; Michael J. Sturtevant, Berkeley; Kenneth R. Walters, Pleasant Hill, California

[21] Appl. No. 721,661

[22] Filed April 16, 1968

[45] Patented Dec. 1, 1970

[73] Assignee American Telephone and Telegraph Company New York, New York

[54] ARRANGEMENT FOR ESTABLISHING CONFERENCE CONNECTIONS IN COMMUNICATION SWITCHING SYSTEMS

6 Claims, 7 Drawing Figs.

[52] U.S. Cl. .......... 179/18

[51] Int. Cl. .......... H04m 3/56

[50] Field of Search .......... 179/18.01, .02, 27.02, 15(AT) (Cursory), 1(Inquired)

[56] References Cited

UNITED STATES PATENTS

| | | | |
|---|---|---|---|
| 1,554,999 | 9/1925 | Gardner | 179/18 |
| 3,099,719 | 7/1963 | Gerbore | 179/18 |
| 3,171,896 | 3/1965 | Bartlett | 179/15 |

*Primary Examiner*—Kathleen H. Claffy

*Assistant Examiner*—David L. Stewart

*Attorneys*—N. S. Ewing and James Warren Falk

ABSTRACT: In a communication switching system all connections are normally established through links set up in a switching network. We disclose a conference bridge circuit arrangement wherein the line circuits in addition to being connected to appearances on the switching network are also connected directly to ports of the bridge circuit. A bridge control circuit is seized through a network path by an originating station and it in turn establishes successive temporary control connections to the desired line circuits. Each successive line circuit is then controlled to release the network path through to the bridge control circuit and instead to enable the direct path to the assigned port of the bridge circuit. The bridge control circuit further controls the establishment of the necessary successive connections of the register circuit through the bridge control circuit to the originating station and the establishment of a communication path for the originating station to a port of the bridge circuit. Accordingly, only one network path is maintained during the conference connection regardless of the number of stations connected to the conference bridge circuit.

INVENTORS W. W. SLOAN
M. J. STURTEVANT
K. R. WALTERS

BY Frederick W. Padden

ATTORNEY

ARRANGEMENT FOR ESTABLISHING CONFERENCE CONNECTIONS IN COMMUNICATION SWITCHING SYSTEMS

BACKGROUND OF THE INVENTION

This invention relates to automatic switching systems and in particular to equipment for setting up conference call connection. More particularly, this invention pertains to equipment for utilizing the facilities of a telephone switching system to establish conference connections for a plurality of conferees over paths separate from the switching network of the system.

It has been previously proposed to set up conference connections in small switching exchanges such as private branch exchanges, PBXs, and individual central offices. In these prior systems, two different procedures for the establishment of station controlled conferences have been proposed. In accordance with one procedure, oftentimes referred to as "meet me" conferencing, each conferee independently dials a conference code number and is accordingly connected via link paths through the switching network to a port of a conference circuit. The other procedure which is most preferred by telephone users because it offers a degree of privacy, is the single station controlled conference. In accordance with that procedure, one station dials a conference code followed by the directory number, or codes, of each of the stations which it is desired to include in the conference. Thereafter, each conferee is interconnected with ports of a conference circuit over link paths of a switching network.

Although such arrangements have proven satisfactory and are in fact preferred over attendant controlled conferencing facilities, they as well as the latter facilities have one common drawback in that each conferee is connected over a plurality of separate paths through the switching network to the conference circuit for the duration of a conference call.

In switching systems where the number of network paths are few and where it is occasionally desirous to interconnect large numbers of stations with a conference circuit, the prior art conferencing arrangements have proven to be either unusable, or in order to accommodate the increased traffic load of the conference circuit the networks have been modified to add more available paths. The latter has proven to be economically burdensome and also particularly undesirable because additional common control circuitry is required to control the added network equipment.

Thus, there is a need for equipment which is capable of interconnecting stations with a conference circuit without substantially decreasing the traffic handling capacity of the existing switching network facilities. There is a further need that such equipment be facilely controllable by stations, or attendants, and utilize the common control circuitry to establish conference connections.

SUMMARY OF THE INVENTION

In accordance with an illustrative embodiment of our invention, conference equipment is furnished which permits any calling station to control the establishment of conference connections over paths independent from those of the switching network. Advantageously these connections are established utilizing our equipment which includes a two-port multiple address control circuit that is connectable via a first one of the ports and a network path to an originating data terminal set by dialing a conference code from the calling station. The second port and a single network path are utilized in accordance with an important aspect of our invention to establish path control connections to various conferees under control of the call originating station. The latter connections are temporary and are utilized to convey preliminary control signals.

To elaborate, the originator dials a predetermined address code to effect the establishment of a connection from the calling line circuit through the switching network to the first port of the multiple address circuit. The latter circuit is then automatically activated for causing its second port to be connected through the switching network to a register circuit. The calling party next transmits an address code of a first conferee station over the established connections through the network and the first and second ports of the conference control circuit into the register for causing the first station to be connected to the second port.

The second port of the multiple address conference control circuit is utilized in a unique manner and in accordance with a salient aspect of our invention to signal the connected conferee line circuit to enable, or establish, a direct path from the desired conferee station to a multiple address conference bridge circuit. The signal is automatically transmitted from the conference control circuit a short time after a connection is established via the second port and the switching network to the called conferee line circuit. Apparatus in the line circuit is responsive to this signal for cutting through a direct connection from the called conferee station to a port of multiple address bridge circuit and which connection is advantageously independent of paths through the system switching network. At approximately the same time, the connection from the latter line circuit through the switching network to the second port of the conference control circuit is made available for serving other calls. Thereafter, the second port of the conference control circuit is automatically connected again through the switching network to a register. The latter returns dial tone to the conference originator via the established connections over the first port for signaling the originator to transmit the address code of the next conferee. The circuit actions that follow for connecting the next conferee station to the conference bridge circuit are essentially the same as those described for the first conferee station.

When all desired conferees are connected to the multiple address bridge circuit over direct path connections independent of the switching network, the originator dials a special code into a register circuit connected to the second port of the multiple address control circuit. Upon detection of this code the register transmits a signal back to the multiple address control circuit which thereafter directly connects the originator to the multiple address bridge circuit and releases the register circuit connection. As a result, all called conferees are connected to the conference bridge circuit over paths independent of the switching network and, in the specific illustrative embodiment, only the conference originator is connected over a path through the switching network.

An ancillary feature of our invention is that the conference connections established via the separate paths are maintained by the multiple address circuit which automatically times certain crucial operational steps performed by the originator. In the event such steps are not performed within prescribed time limits, the direct paths from the called conferee station through the line circuit to the conference bridge circuits are released.

Another feature is that circuitry is furnished in the multiple address circuit for limiting the number of stations which are connectable via the direct paths to the conference bridge circuit. When the originator attempts to add more conferees than the predetermined number allowable a tone signal is returned to indicate that a maximum number of conferees are presently connected to the conference bridge.

It is noted that our equipment, in particular the multiple address control circuit, is suited to a cross bar type of switching system, although not necessarily so limited. The address circuit includes holding circuitry for maintaining connections to the first port via the crossbar network under control of a supervisory signal from the originator. Connections to the second port are held in response to the signal from the originator and also in response to a supervisory signal from the conferee line circuit connected thereover.

It is further noted that our illustrative embodiment depicts data sets connected over station lines to a switching network. It will become apparent that station sets can be connected thereover and function compatibly with out invention. Also, our conference equipment can be controlled by an attendant for establishing conference connections over the direct paths.

BRIEF DESCRIPTION OF THE DRAWING

The foregoing and other structural aspects and advantages of this invention will be more clearly understood from a reading of the following description of an illustrative embodiment with reference to the drawing in which.

Figures 1, 7:
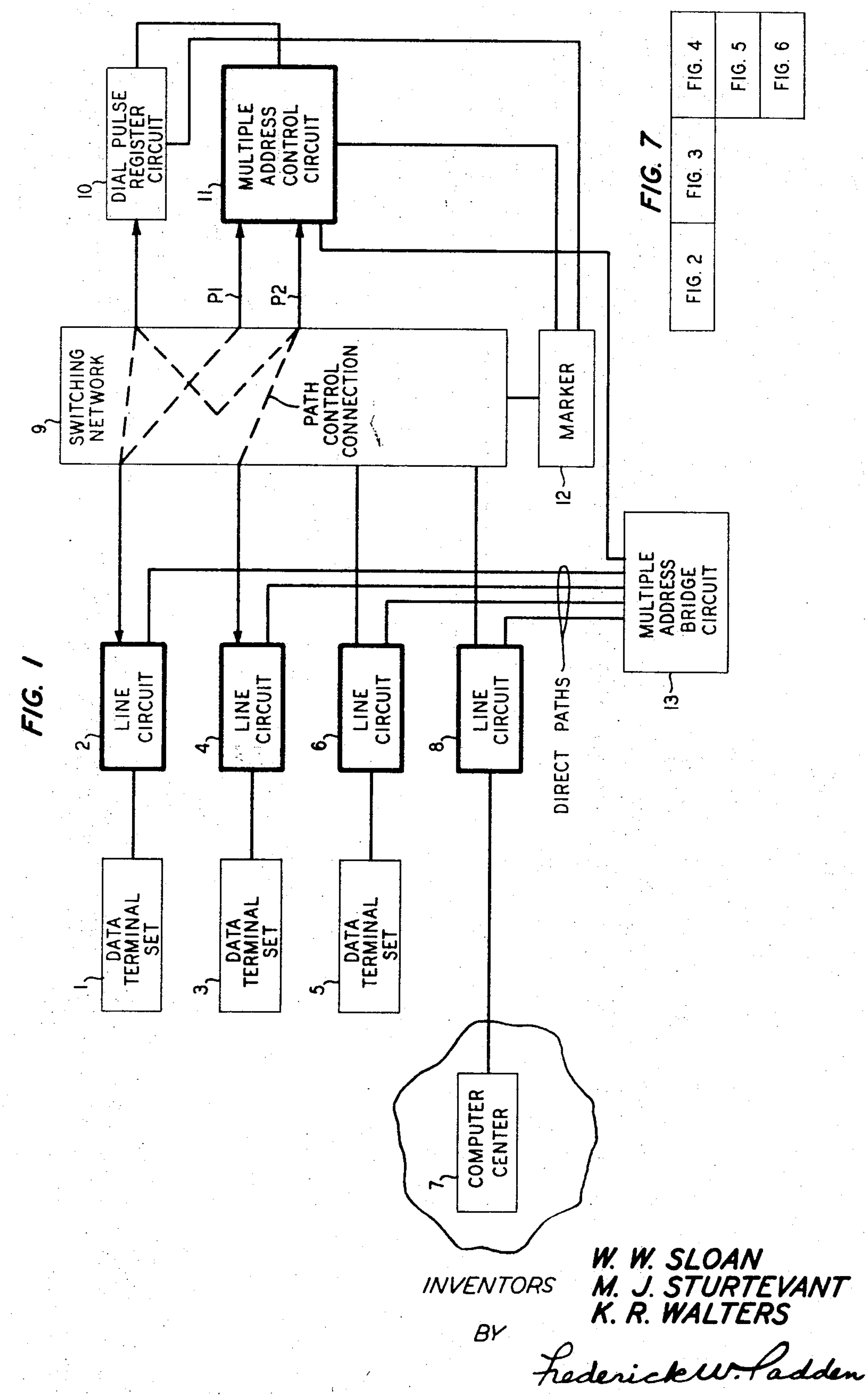
FIG. 1 shows a block diagram depicting our conferencing equipment and in particular line circuits, a multiple address control circuit and a multiple address bridge circuit connected in a common control switching system.
FIG. 7 shows the manner of interconnecting FIGS. 2 through 6.

As shown in the drawing, a multiple address control circuit in accordance with out invention is arranged to be interconnected and cooperate with an automatic telephone system wherein common control circuits are utilized to control the establishment of call connections through a switching network. One such system is disclosed in H. H. Abbott et al. U. S. Pat. No. 2,949,506 of Aug. 16, 1960. Our illustrative equipment is disclosed herein in a telephone system of the type disclosed in the Abbott et al. patent. It is to be understood, however, that the present invention is not limited for use with such a telephone system but may be utilized with other types of switching systems.

For the purpose of illustration, it is intended that the apparatus of switching network 9, register circuit 10, and marker 12 be similar to the corresponding apparatus disclosed in the Abbott et al. patent.

It is noted that the network of Abbott et al. employs so-called six-point crossbar switches which are split so that three leads are closed by the switch operations for interconnecting the network terminals. The split wiring of these switches is eliminated in this illustrative embodiment to accommodate four-wire switching which in practical effect requires the closure of six wires upon the operation of a switch. The switch wiring without the split wiring may be seen in FIG. 3. Aside from this difference, Abbott et al. may be referred to for the operations of the select and hold magnets of the crossbar switches.

It is noted at this juncture that data equipment is connected to the line circuits in the illustrative embodiment in place of the station sets which are disclosed in Abbott et al. However, it will become apparent from the subsequent discussion that either can be advantageously utilized in a switching system embodying our invention.

In the drawing, relays are shown in detached form, i.e., the operative relay winding and its contacts are separated to facilitate the disclosure of our invention. Each relay winding designation consists of a number followed by a functional designation with the number indicating the figure on which the winding is shown. Contacts of a relay are designated the same as the operative winding and, in addition, include a suffix numeral to identify the particular contact.

GENERAL DESCRIPTION

The interrelation and function of equipment units of the exemplary embodiment will now be described with reference to FIG. 1 wherein the interconnections between certain of the circuit blocks have been indicated by means of arrows to show the direction of circuit action. In accordance with our invention a multiple address control circuit 11, shown in heavy lined block, is provided which has two ports designated P1 and P2 both being permanently connected to appearances in network 9. Port P1 is referred to as the input port and port P2 is called an output port for convenience in referring to them herein. The input and output ports are interconnected by circuitry of the multiple address control circuit 11 so that pulsing signals received on port P1 are conveyed to port P2 and tone signals on port P2 are coupled to port P1.

The invention described herein is also embodied in line circuits 2, 4, 6 and 8 shown in heavy line blocks which comprise signal responsive apparatus for connecting terminal equipment such as data terminal sets 1, 3 and 5, or computer center 7 directly via indicated direct paths to a multiple address bridge circuit 13. The latter circuit is a so-called conference bridge circuit and may be of any suitable type which permits two-way communication between all the line circuits connected thereto over the direct paths. The bridge may include amplifiers and various forms of echo suppressing devices. Typical bridge circuits, oftentimes termed multiway circuits, are shown in G. Grisson et al. U.S. Pat. No. 1,623,095 of Apr. 5, 1927; C Green U.S. Pat. No. 2,019,603 of Nov. 5, 1935; and J. A. Parrott U.S. Pat. No. 2,154,579 of Apr. 18, 1939. To provide such facilities for four-wire transmission and in the instance a greater number of terminals are required, two or more of the circuits described in the aforementioned patents may be connected together.

If it is desirous to establish a so-called broadcast conference, the aforementioned patents can be utilized to interconnect the receiving conferees with the broadcasting conferee. To accomplish this, only the receive leads of the four-wire line circuits associated with each conferee are connected to the conference bridge circuit.

When a caller at data terminal set 1 originates a conference call, set 1 is connected through the switching network 9 to a dial pulse register circuit 10 under control of a marker 12 in a manner as disclosed in the Abbott et al. patent. Register 10 then returns dial tone to the caller and the caller dial pulses a preassigned code designating the address of port P1 of the multiple address control circuit 11. This code may be a single digit code, or it may be a complete seven-digit code depending upon the type of switching system and the digit storage capacity of register circuit 10. Marker 12 and register circuit 10 respond to the latter code, and set up an intraoffice connection from set 1 through line circuit 2, and switching network 9 to the input port P1, of the multiple address control circuit 11.

When the connection is established to the input port P1, marker 12 automatically establishes a connection from port P2 via network 9 to a register circuit, for example, register 10, which although used on the previous connection is available at this time. Circuit 10 returns a dial tone to port P2. The tone is coupled to port P1 by the multiple address control circuit 11 and returned to the originator via network 9 whereupon he transmits additional calling signals designating the first conferee. As a result, a call connection is established between port P2 and the line circuit of the called station, for example, data terminal set 3 via a path through line circuit 4, network 9 which is indicated by dashed line and designated a "path control connection".

In accordance with an important aspect of our invention, the line circuit 4 is operative for enabling, or establishing, a direct path connection from set 3 to the multiple address bridge circuit 13 in response to a directing signal transmitted by the multiple address control circuit 11. The latter signal is transmitted over the established connections to line circuit 4 for a predetermined interval after the establishment of the connection from port P2 to set 3. Apparatus of line circuit 4 provided in accordance with our invention is responsive to this signal both for connecting set 3 directly to the multiple address bridge circuit 13 via a path designated "direct path" and for releasing the aforementioned path control connection from line circuit 4 via network 9 to port P2. Specifically, circuit 11 monitors the path control connection to port P2 for detecting an answer signal from the called set before sending the aforementioned directing signal. Upon the receipt of the answer signal, a timer in the conference control circuit 11 is activated and after a timed interval causes circuit 11 to transmit the directing signal over the path control connection to line circuit 4. Thereafter circuit 11 continues to monitor the latter connection to port P2 for determining when that connection is released so that a connection to register circuit 10 can be reestablished in preparation for adding a second conferee or for connecting the originator to the conference bridge circuit.

A timed pause interval is interposed after the called set answers to allow for the transmission of a "turn-on" signal by the originator and its receipt by the called set. As is well known, this signal is utilized to put the called set in a so-called receive mode for receiving messages subsequently transmitted via bridge circuit 13.

When all the desired conferees are connected to bridge circuit 13, the originator at set 1 dials a special code into register circuit 10 following its automatic connection to port P2 after the last conferee connection to bridge circuit 13. Register circuit 10 is arranged to recognize this code and to return a signal to control circuit 11 which releases the register connection. Also, circuit 11 directly connects port P1 to bridge circuit 13 to complete the conference connection.

If, during the establishment of the conference call, the originator at set 1 abandons the conference call or does not proceed to establish the conference within prescribed time limits, the established connections to circuit 13 over the direct paths are automatically released. To elaborate, various operations of the originator are timed, for example, circuit 11 is arranged to time the period it takes the originator to dial a new conferee number after a register circuit is connected to port P2. If this period is exceeded, circuit 11 transmits a release signal to circuit 13 and, accordingly, all circuits connected over direct paths are released.

In the event one or more of the data sets connected over the direct paths to circuit 13 release prematurely, i.e., before the originators is connected to bridge circuit 13, all of the connected conferees are released and a trouble tone is returned to the originator.

The number of conferees which may be added in conference is limited to a predetermined number. If the originator attempts to add more conferees than the allowed maximum, a tone signal is returned to apprise him of this fact. The maximum number of allowable conferees is normally predicated on the capacity of bridge circuit 13. If it should be desirous to limit such number to less than this maximum number, our circuitry is capable of counting a lesser number and sending a tone signal to the originator.

DETAILED DESCRIPTION

Figure 3:
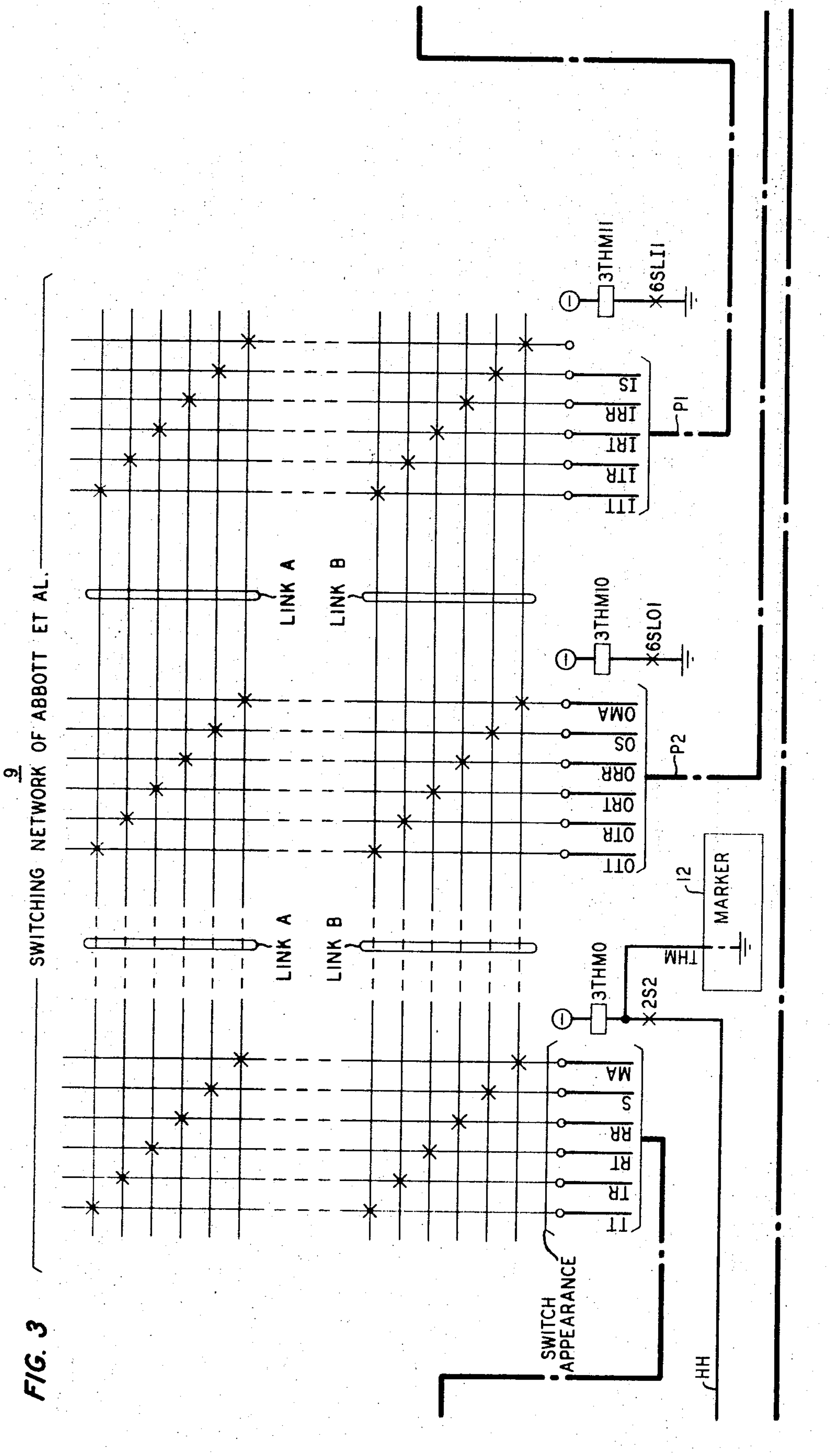
FIG. 3 shows pertinent portions of the switching network for depicting network connections to the line circuit as well as to the multiple address control circuit.
Figure 4:
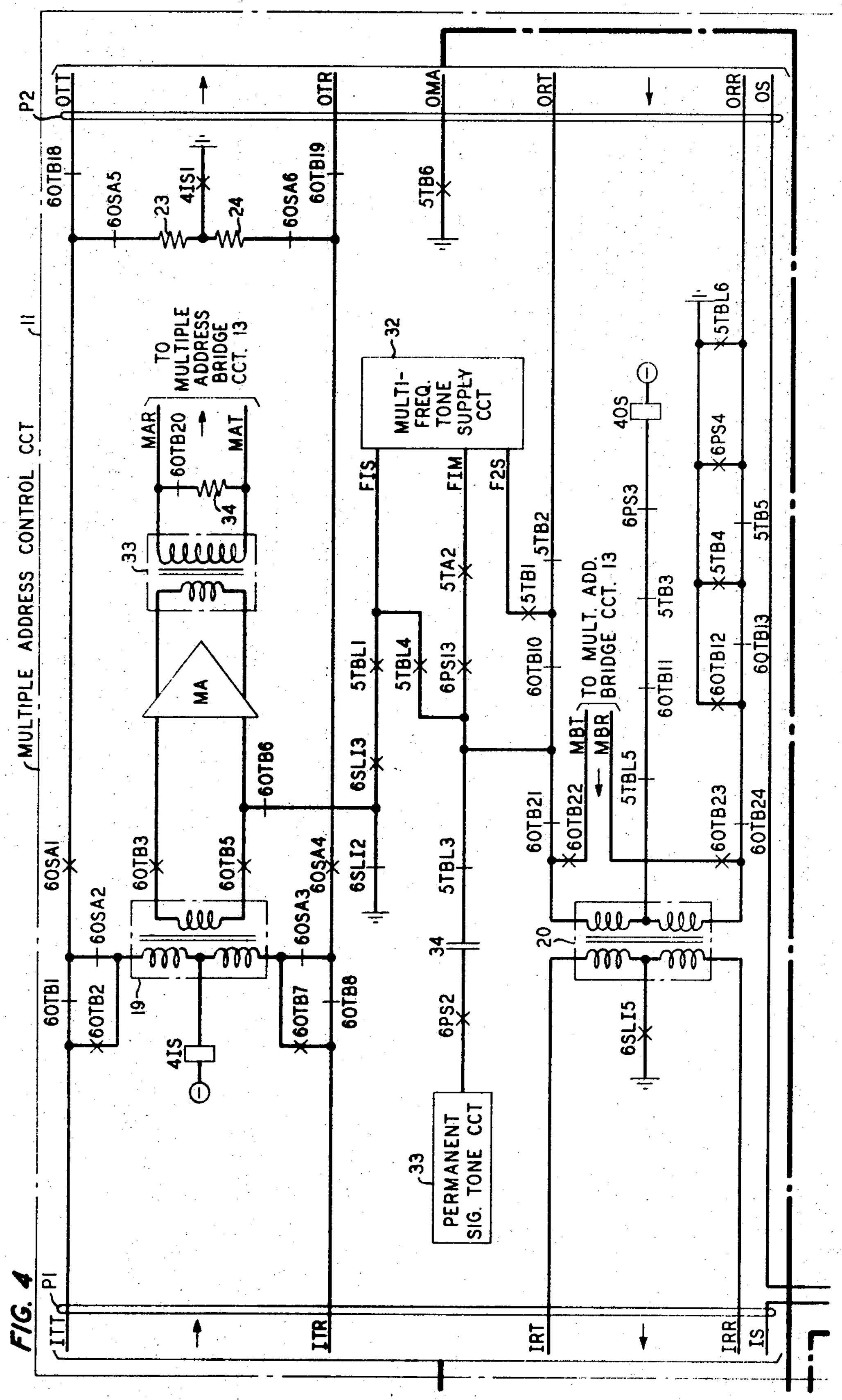
FIGS. 4, 5 and 6 depict the multiple address control circuit interconnected with an office common control circuit and the switching network.
Figure 5:
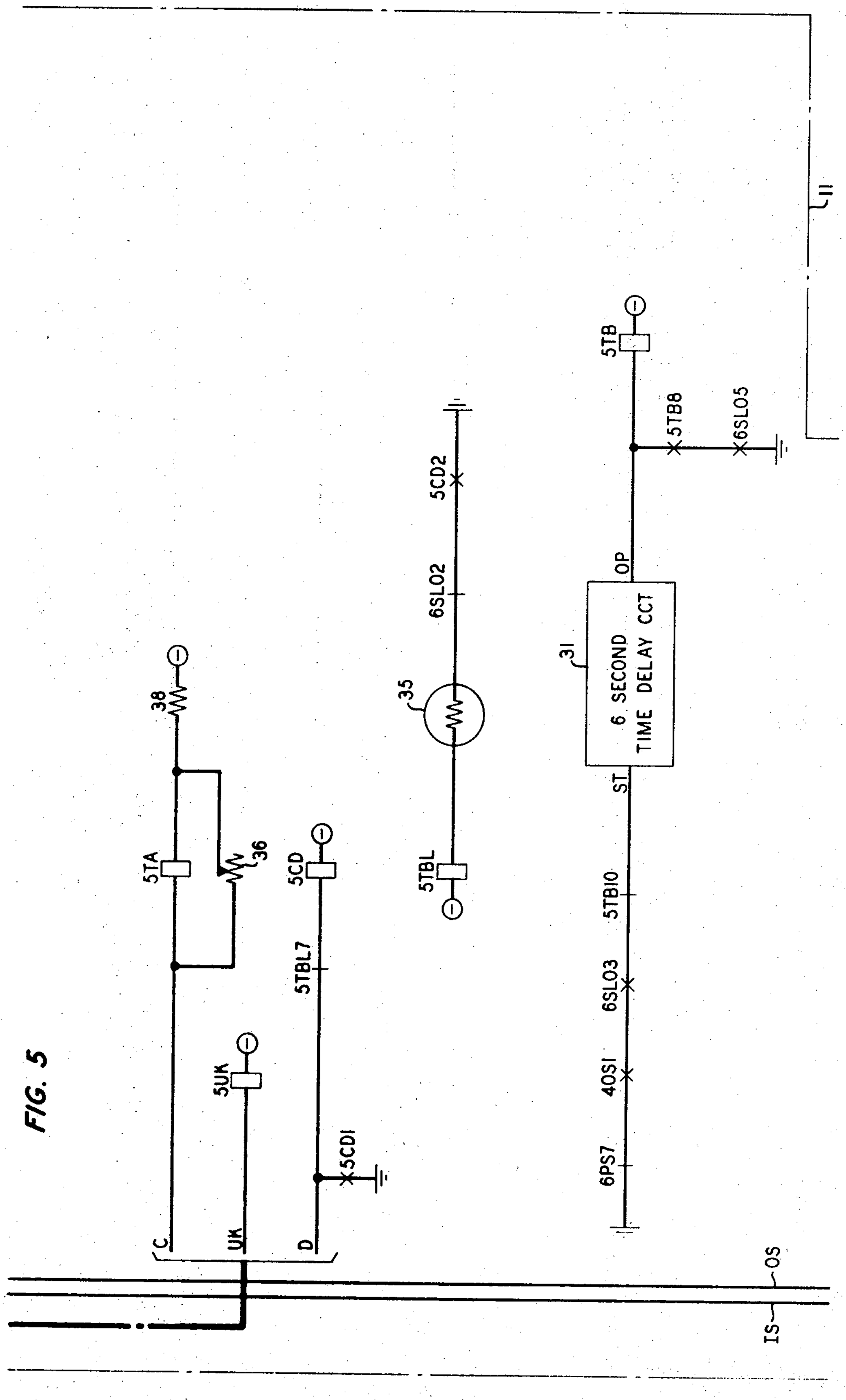
Figure 6:
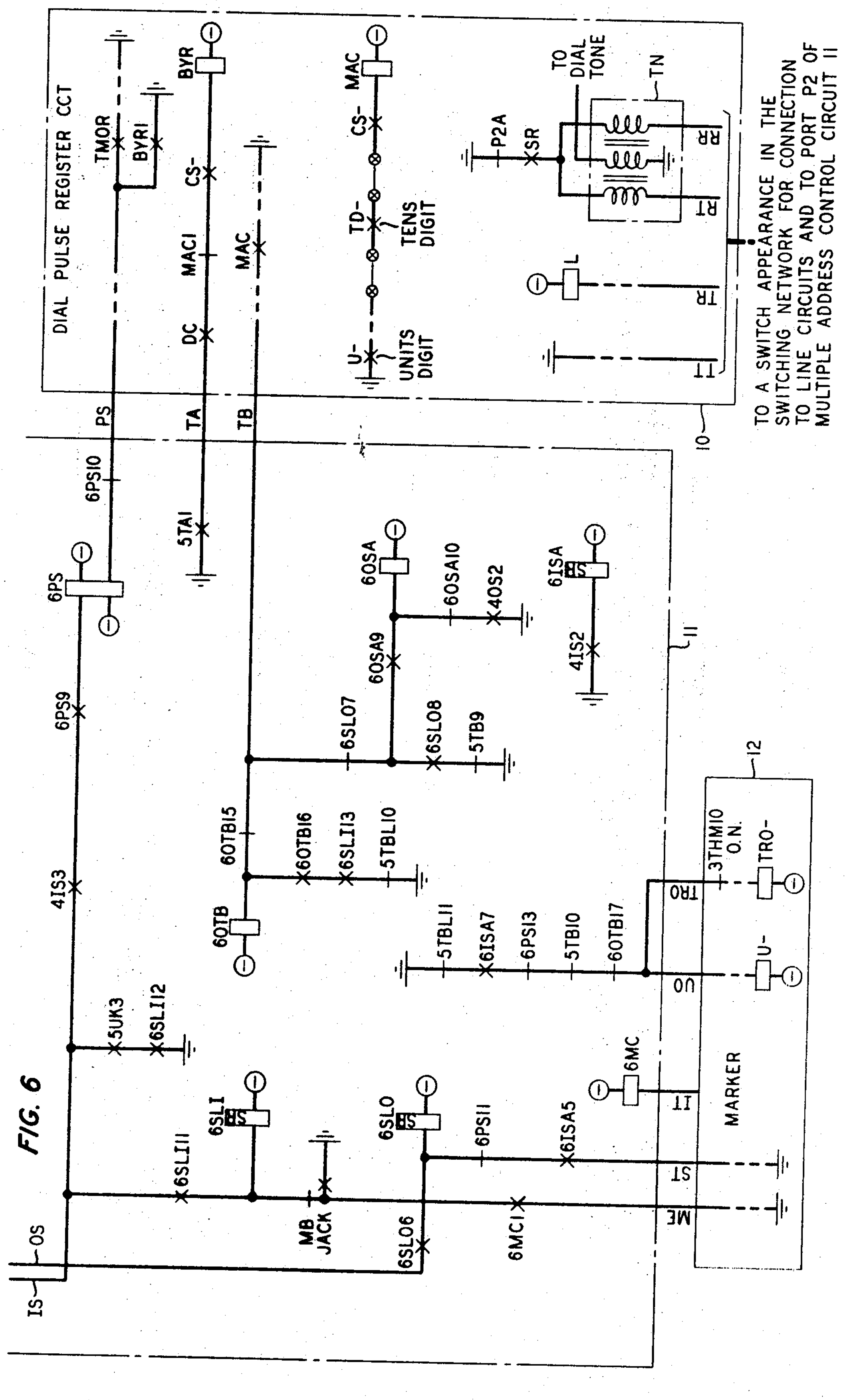

Referring now FIGS. 2 through 6, a detailed description will be presented of the circuit operations for establishing a conference call between stations of a crossbar-type switching office which is equipped by way of illustration with our invention In order to facilitate the presentation of the detailed disclosure, the circuit description has been subdivided as follows I Connecting the Controlling Set to Control Circuit 11;
II Establishment of a Connection from Port P2 to a Conferee,
III Connection of the First Conferee to Bridge Circuit 13;
IV Connecting the Originator's Line Circuit to the Conference Connecting;
V Timing the Register Circuit Connection to Port P2 of Control Circuit 11;
VI. Premature Disconnect by a Conferee connected Directly to Bridge Circuit 13;
VII Exceeding the Predetermined Number of Allowable Conferees; and
VIII Release of the Conference Connection;

FIGS 4, 5 and 6 disclose the circuitry of the multiple address control circuit 11 which, in accordance with the ensuing illustrative embodiment of our invention is controllable from a data terminal set over port P1 for establishing path control connections to conferee line circuits via port P2 over which latter connections circuit 11 automatically enables the establishment of direct paths to the multiple address bridge circuit 13. Ports P1 and P2 of the latter circuit are identified in FIG. 4 and also in FIG. 3 wherein they are connected to separate switch appearances of switching network 9. To the left-hand side of the drawing is FIG. 2 disclosing a line circuit. That circuit is used to illustrate the line circuit operations of both the originator line circuit 2 and the first conferee line circuit 4.

I. Connecting the Controlling Set to Control Circuit 11

Assume that set 1 of FIG. 1 desires to establish a conference call with data terminal sets 3 and 5 and computer center 7. When such a call is originated at set 1, a marker 12 is engaged to control the establishment of a connection from line circuit 2 to register circuit 10 via an available idle link of network 9. Common control circuit operations during the establishment of this connection are disclosed under the section headed "Dial tone connection" in column 18 of the Abbott et al. patent. After this connection is established the originator transmits the address assigned to port P1 of the multiple address control circuit 11 for storage in register circuit 10. Thereafter, the latter initiates a so-called completing connection during which marker 12 control the establishment of a connection via a link of network 9 from line circuit 2 to port P1 of control circuit 11. The latter connection, indicated in FIG. 1 by dashed line, is established in a customary manner the stored address in register circuit 10 as described under the heading "Completing the connection" in column 47 of Abbott et. al.

Figure 2:
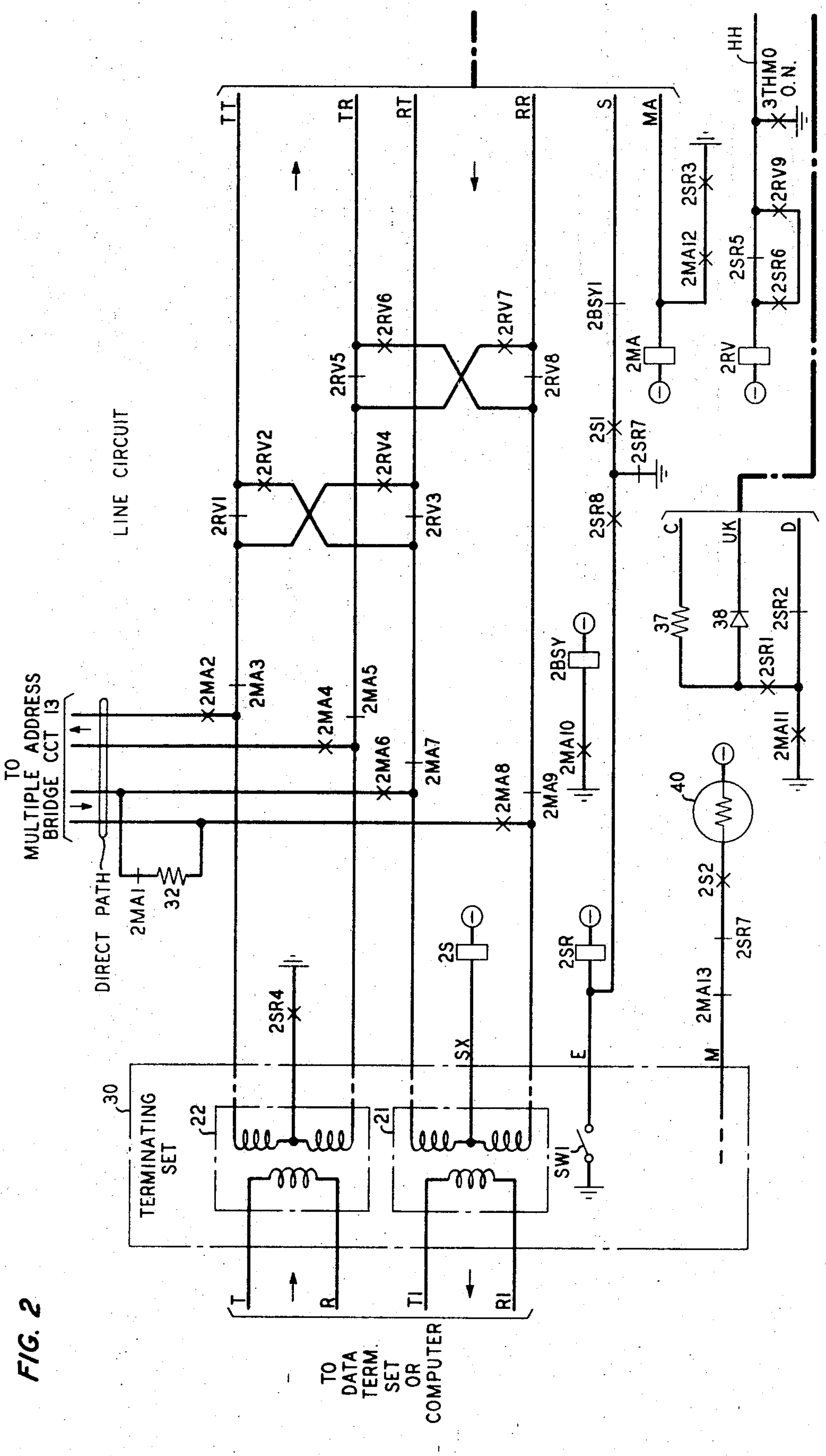
FIG. 2 shows a line circuit with connections to a switching network and also to the multiple address bridge circuit and multiple address control circuit.

Turning now specifically to FIGS. 2 to 6, during the establishment of the completing connection, marker 12 operates relay 6MC of the multiple address control circuit 11 shown in the lower left side of FIG. 6. The operation of this relay sets up a path for operating the crossbar switch hold magnet 3THM11 of the switching network 9 shown in FIG. 3 and associated with port P1. Referring again to FIG. 6, relay 6MC also sets up a path for operating relay 6SLI from marker 12 over a path from its winding via a contact of the MB jack, contact 6MC1 and lead ME. In a manner similar to that disclosed in Abbott et al. in the section headed "Completing connection to central office trunk" beginning in column 87, when the hold magnet is to be operated marker 12 connects ground to lead ME through various contacts indicated by dashed line. This ground operates relay 6SLI. Referring to FIG. 3, operated contact 6SLI1 connects ground to hold magnet 3THM11 winding for operating it.

At the same time, the crossbar switch hold magnet associated with line circuit 2 is also operated for closing a link between port P1 and the latter circuit. (See the last-mentioned section in Abbott et al.) Assuming for this discussion that the line circuit depicted in FIG. 2 is line circuit 2, the closure of the link, for example link B of FIG 3, connects leads ITT, ITR, IRT, IRR and IS of port P1 respectively to leads TT, TR, RT, RR and S. It is noted that lead MA shown in FIGS. 2 and 3 connected from line circuit 2 to the network is unused inasmuch as there is no corresponding wiring to the switch appearance from port P1 of control circuit 11

Supervisory signals are exchanged between the interconnected line circuit 2 and control circuit 11 over the established link B. The signal from circuit 11 operates relay 2S (FIG 2) of line circuit 2 and a calling supervisory signal is transmitted by the latter circuit for operating relay 4IS of FIG. 4 in circuit 11. Line circuit 2 also transmits a signal over link B for holding relay 6SLI of FIG 6 operated. In particular with reference to the lower left-hand corner of FIG. 4, circuit 11 transmits a signal to line circuit 2 when contact 6SLI5 grounds the mid point of the primary winding of transformer 20. This ground is connected to leads IRT and IRR which may be traced to FIG. 3, through the closed link B, leads RT and RR connected to the line circuit 2 switch appearance, and to FIG. 2 and therein to operate relay 2S via respectively contacts 2RV3, 2RV8, 2MA7 and 2MA9, and transformer 21 of terminating set 30, over lead SX to the winding of relay 2S. In turn, line circuit 2 transmits a holding ground for operated relay 6SLI of FIG. 6 over lead S which is grounded by terminating set 30 at switch SW1, lead E, contacts 2SR8, 2S1 and 2BSY1 and which may be traced to FIG. 3, through operated link B of the switching network, lead IS of port P1 and through FIGS. 4,5 and 6, contact 6SLI11 to the winding of relay 6SLI. Relay 2SR is operated from a supervisory signal transmitted by data terminal set 1 and received at terminating set 30. Circuitry of terminating set 30 symbolically indicated by switch SW1 in turn connects ground to lead E for operating relay 2SR and grounding lead S. The calling supervisory signal is transmitted by line circuit 2 via operated contact 2SR4 which connects ground to the midpoint of the secondary winding of transformer 22 of set 30 which ground is coupled by contacts 2MA3, 2MA5, 2RV1 and 2RV5, leads TT and TR which may be traced to FIG. 3., through link B of the switching network and leads ITT and ITR to FIG. 4. In the latter figure lead ITT is connected via contacts 60TB1, 60SA2, the upper winding of transformer 19 to the winding of relay 4IS. Also the ground on lead ITR is coupled via contacts 60TB8 and 60SA3 and the lower winding of transformer 19 to the winding of relay 4IS. As is subsequently described, the operation of relay 4IS of FIG. 4 automatically requests a register connection to the switch appearance of port P2 of control circuit 11 for the establishment of a connection to the first conferee.

II. Establishment of a Connection from Port P2 to a Conferee

When relay 4IS operates, as previously described, circuit 11 automatically transmits a request for service signal to marker 12 which controls the establishment of a connection from register circuit 10 to port P2 of control circuit 11. In particular, the signal is transmitted by relay 6ISA of FIG. 6 which is a slave relay to relay 4IS and which operates over an obvious path from ground and contact 4IS2. As disclosed in the Abbott et al. patent under the section headed "Dial tone connection" beginning in column 18, a request for service is made by transmitting the tens and units identity of the calling station to marker 12. In this instance, it is desirous to connect register circuit 10 to port P2 and accordingly the identity of port P2 is transmitted to marker 12. Specifically with reference to FIG. 6, leads TRO and UO are grounded for respectively operating marker relays TRO- and U- as shown in FIGS. 11 and 15 of Abbott et al. The operating path for the marker relay TRO- may be traced from its winding over marker relay contacts not shown but indicated by a dashed line, off-normal contact 3 THM10 O.N. of the hold magnet associated with port P2, lead TRO, contacts 60TB17, 5TB10, 6PS13, 6ISA7 and 5TBL11 to ground. Marker relay U- is operated over these same circuit 11 contacts and ground which is coupled to the winding of marker relay U by lead UO and various marker relay contacts (not shown).

In a customary manner, marker 12 after giving preference to this request selects an idle register circuit, for example, circuit 10 of FIG. 6, locates an idle link path, for example link A, and controls the establishment of a connection between port P2 and register circuit 10 in a manner as described in Abbott et al. Specifically, relay 6SLO of FIG. 6 is operated by marker 12 to operate hold magnet 3THM10 shown in FIG. 3 for closing the port P2 end of link A to register circuit 12. The operating path for relay 6SLO may be traced from its winding through contacts 6PS11 and 6ISA5, lead ST, and contacts of marker relays to ground which are shown in FIG. 30 of Abbott et al. Referring to FIG. 3, hold magnet 3THM10 is operated over an obvious path from ground and contact 6SLO1. For the operation of the register circuit hold magnets, reference may be made to FIG. 6 OF Abbott et al. and to the detailed description therein beginning in column 18.

It is noted that Abbott et al. in FIG. 18 discloses a dial pulse register circuit in which the pulsing relay, L, is connected to the switching network for detecting the dialed address. As shown in our FIG. 6 the Abbott et al. register circuit is modified by redesignating leads T and R as leads TT and TR so that upon the closure of link A the L relay is connected to respective leads OTT and OTR of port P2. In addition, the Abbott et al. register circuit is further modified by utilizing a new contact on relay SR and a new contact of relay P2A to connect ground via the dial tone transformer TN to newly added leads RT and RR which are also connected by link A to respective leads ORT and ORR of circuit 11. Accordingly, upon the closure of link A between port P2 of circuit 11 and register circuit 10, referring to FIG. 4, ground is connected to leads OTT and OTR by operated contact 4IS1, resistors 23 and 24, and contacts 60SA5, 60TB18, 60SA6 and 60TB19 via network 9 to operate the L relay of register circuit 10. In response thereto, register circuit 10 connects ground to the newly added leads RT and RR upon the operation of its relay SR which ground is coupled via network 9 to leads ORT and ORR of circuit 11 shown in FIG. 4 to operate relay 40S. The operation of the latter relay indicates the connection of register circuit 10 to port P2. More particularly, the operating path for relay 40S in circuit 11 includes lead ORT, contacts 5TB2, 60TB10, and 60TB21, the upper winding of transformer 20 and a series path connected to the midpoint of transformer 20 via contacts 5TBL5, 60TB11, 5TB3, 6PS3, to the winding of relay 40S. Also, the path from lead ORR includes contacts 5TB5 and 60TB13, the lower winding of transformer 20 and the aforementioned series connected relay contacts to relay 40S.

The aforementioned relay 6SLO in FIG. 6 is held operated by register circuit 10 over a path from the winding of relay 6SLO, through contact 6SLO6, lead OS via FIGS. 5, 4, and 3 to the port P2 network appearance and thence via link B to lead S of register circuit 10 which provides a ground through a contact 12 of relay SR and resistor S as shown in FIG. 18 of Abbott et al.

For this four-wire application, register circuit 10 connects a dial tone directly to newly added leads RT and RR as shown in FIG. 6. This tone is coupled via link A, circuit 11 and the connection from port P1 via link B to line circuit 2 for indicating to the originator the establishment of the register connection to port P2. More particularly referring to FIG. 4, tone is coupled in circuit 11 over leads ORT and ORR, contacts 5TB2, 60TB10, 5TB5 and 60TB13, transformer 20, leads IRT and IRR, and link B closed between port P1 and line circuit 2. In the latter circuit the tone is connected over leads RT and RR, contacts 2RV3, 2RV8, 2MA7 and 2MA9, and transformer 21 of terminating set 30 to the originator.

Upon receipt of dial tone, the originator at set 1 transmits dial pulses which are coupled over link B, control circuit 11, and link A to connected register circuit 10. These pulses designate the first conferee address and, in a customary manner, upon the receipt of all pulses register circuit 10 requests a completing connection between port P2 and the designated conferee line circuit. Specifically with reference to FIG. 2, the originator transmits dial pulses to terminating set 30 which, in turn, pulses lead E and relay 2SR. In response to each pulse repeated by terminating set 30 the repeating circuitry symbolically shown as a switch SW1 operates and releases relay 2SR and, in turn, its contact 2SR4 connected to the midpoint of transformer 22 repeats the pulses over leads TT and TR to circuit 11. The latter pulse repeating path may be traced from ground, pulsing contact 2SR4, the windings of transformer 22, contacts 2MA3, 2RV1, 2MA5 and 2RV5, leads TT and TR which can be traced to FIG. 3, line circuit 2 switch appearance, link B, leads ITT and ITR of port P1, contacts 60TB1, 60SA1, 60TB18 to lead OTT and contacts 60TB8, 60SA4, and 60TB19 to lead OTR. Leads OTT and OTR are coupled via link A to register circuit 10 for pulsing its L relay.

It is opportune to note at this time that relay 60SA of FIG. 6 is operated to provide this direct pulsing path through circuit 11 as a result of the operation of relay 40S previously described. The operating path for relay 60SA may be traced from its winding, contacts 60SA10 and 40S2 to ground and a locking path may be traced over contacts 60SA9, 6SLO8 and 5TB9 to ground. It is further noted that the previously described preliminary operating path in circuit 11 for operating the register circuit 10 L relay is disconnected in order that pulses from circuit 2 are not shunted. Specifically, as shown in the upper right-hand corner of FIG. 4 contacts 60SA5 and 60SA6 open the bridge circuit including resistors 23 and 24. Relay 4IS of FIG. 4 is also released by the operation of contacts 60SA2 and 60SA3 which disconnect that relay from leads ITT and ITR.

When the called number of set 3, for example, is stored in register circuit 10, the latter transmits a request for service signal to marker 12 and in a manner as described in Abbott et al. marker 12 controls the establishment of a connection between port P2 and line circuit 4 via network 9. This connection is established over link A presently connected to register circuit 10 in a manner as the connections described in the section entitled "Completing connection to central office trunk," column 87 of Abbott et al. Assuming for this discussion that the line circuit of FIG. 2 depicts line circuit 4 instead of line circuit 2, the operation of hold magnet 3THMO in FIG. 3 by ground from marker 12 over lead THM connects leads TT, TR, RT, RR, S and MA of circuit 4 via link A of network 9 directly to respective leads OTT, OTR, ORT, ORR, OS and OMA of control circuit 11. Relay RV in FIG. 2 is operated for reversing the "transmit" (leads TT and TR) and "receive" (leads RT and RR) paths of line circuit 4 for arranging the proper supervisory paths between the connected circuits. The operated path for relay RV can be traced from its winding through contact 2SR5 and off-normal contact O.N. of hold magnet 3THMO.

Relay 40S of FIG. 4 monitors the "receive" path of called line circuit 4 to detect an answer indication. It will be recalled that relay 40S was operated by register circuit 10 when first connected to port P2. Shortly thereafter relay 40S was released upon the receipt of the first dial pulse in register circuit 10. With reference to FIG. 6 and to register circuit 10 therein, the latter is accomplished by the aforementioned newly added contact of relay P2A which is connected in series with the aforementioned new SR relay contact to prevent the return of ground over leads RT and RR after receipt of the first digit.

Relay 2S in line circuit 4 is operated over the connected link A, by the supervisory signal from the originator and it activates a ringing connection circuit of terminating set 30 for applying ringing current to alert the called set 3 of this call. Specifically, this circuit is activated by battery on lead M of set 30 via contacts 2MA13, 2SR7 and 2S2 and resistance lamp 40. The path for operating relay 2S may be traced from its winding, lead SX, the windings of transformer 21 and contacts 2MA7, 2RV2, 2MA9 and 2RV6 to leads TT and TR which are coupled via link A of network 9 to respective leads OTT and OTR of FIG. 4. It will be recalled that relay 60SA of FIG. 6 is operated as previously described and therefore the supervisory ground connected by the originator line circuit via the link connected to port P1 to leads ITT and ITR of FIG. 4 is directly coupled to leads OTT and OTR via contacts 60TB1, 60SA1, 60TB18, 60TB8, 60SA4 and 60TB19. Accordingly, relay 2S in line circuit 4 is directly held by the supervisory signal from the originator line circuit 2.

It is noted that a holding path is provided to maintain hold magnet 3THMO operated upon the operation of relay 2S in line circuit 4. This path may be traced from the hold magnet winding, via contact 2S2, lead HH and contact 3THMO O.N. of the operated hold magnet 3THMO to ground.

When set 4 answers, the ringing signal is removed and a signal is transmitted from set 4 to terminating set 30. In turn, circuitry of the latter set shown symbolically by switch SW1 closes ground to lead E for operating relay 2SR. Operated contacts of this relay cause transmission of an answer signal to control circuit 11 for operating in FIG. 4 relay 40S. Specifically with reference to FIG. 2, contact 2SR4 connects ground to the midpoint of transformer 22 which is connected via contacts 2MA3, 2RV4, 2MA5 and 2RV7 to leads RT and RR and thence through the closed link A shown in FIG. 3, leads ORT and ORR of port P2 to FIG. 4. Therein leads ORT and ORR are connected for operating relay 40S via contacts 5TB2, 60TB10, 60TB21, 5TB5, 60TB13, and 60TB23, transformer 20 and contacts 5TBL5, 60TB11, 5TB3 and 6PS3 to the winding of relay 40S.

It is noted that relay 6SLO of FIG. 6 held priorly by register circuit 10 over lead OS and link A is maintained operated by line circuit 4, A path for holding relay 6SLO may be traced from its winding contact 6SLO6, lead OS which traverses FIGS. 5, 4, and 3 via the network link, lead S connected to the line circuit 4 switch appearance, and contacts 2BSY1, 2S1 and 2SR7 to ground, upon the operation of relay 2SR this holding path is transferred to ground over lead E from terminating set 30 for holding directly from the answer supervisory signal.

Upon the operation of relay 2SR in FIG. 2 a holding path for relay 2RV is established. This holding path may be traced from the winding of relay 2RV through contact 2SR6, 2RV9 and the off-normal contact 3THMO O.N. of hold magnet 3THMO.

As previously described, there is a metallic path via links A and B of network 9 and through control circuit 11 for directly interconnecting the originating line circuit 2 with line circuit 4. Over this path and after the called station answers, the originator can transmit "turn on" signals which are received by data terminal set 3 for switching its data equipment to the receive mode. As subsequently described, the connection from port P2 to line circuit 4 is short in duration for it is disconnected as soon as the "transfer to bridge circuit" signal is received at the latter circuit.

III. Connection of the First Conferee to Bridge Circuit 13

Upon the receipt of the answer signal at control circuit 11, a timing interval is initiated after which the latter circuit automatically transmits a special signal to line circuit 4 for enabling, or establishing, a direct path connection from data terminal set 3 to the multiple address bridge circuit 13. Circuit 4 is operated upon receipt of this signal for automatically connecting directly to bridge circuit 13 and for releasing the connection to port P2. Advantageously, this circuit action frees port P2 for reuse in establishing subsequent path control connections to other conferees. Importantly, the conferees are connected via separate direct paths to the conference bridge thereby eliminating the necessity of using network paths, or links on the conference call.

Referring to FIG. 5, time delay control circuit 31 is activated by start ground signal on lead ST for timing a 6-second interval and thereafter for grounding lead OP to operate relay 5TB. The start signal may be traced from lead ST through contacts 6SLO3 and 40S1 to ground. Digressing momentarily, it will be recalled that since relays 40S and 6SLO are operated when a register is connected to port P2 these contacts are closed at that time, however, this path is opened by the release of relay 40S which occurs when the first digit is received at the connected register circuit. Under normal operation therefore relay 5TB is not operated unless the originator delays longer than 5 seconds before transmitting the first digit.

The operation of relay 5TB after timing circuit 31 times out causes the transmission of a special signal over the link to line circuit 4. Specifically, with reference to the right-hand side of FIG. 4, contact 5TB6 connects ground to lead OMA of port P2 which ground is conveyed over link A to lead MA connected to the line circuit 4 switch appearance. Referring to FIG. 2, relay 2MA operates from ground on lead MA and locks operated via contacts 2MA12 and 2SR3.

Before proceeding with a discussion of the operation in line circuit 4 as a result of the operation of relay 2MA, let us continue with the operation of control circuit 11 as a further result of the operation of relay 5TB. The latter relay in FIG. 5 is locked up over a path from its winding, contacts 5TB8 and 6SLO5 to ground. Time delay circuit 31 is also recycled because ground is removed from lead ST by contact 5TB10. Additionally, relay 40S, and in turn its slave relay 60SA, is released by operated contact 5TB3 shown near the winding of relay 40S in FIG. 4. Slave relay 60SA shown in FIG. 6 releases inasmuch as contact 5TB9 shown in the holding path is operated and contact 40S2 in the operating path of that relay is released. In addition to the foregoing, with reference to FIG. 4, tone is sent back to the originator to indicate the transmission of the special signal to the first conferee. In particular, tone is coupled from lead F2S of a multifrequency tone supply circuit 32, via contacts 5TB1, 60TB10 and 60TB21 and transformer 20 to the originators line circuit which is connected via network 9 to leads IRT and IRR.

Returning now to the operation in line circuit 4 following the operation of relay 2MA, the "transmit" and "receive" leads are connected over a direct path to bridge circuit 13. Specifically, leads T and R to the data terminal set 3 are coupled through transformer 22 of terminating set 30 and thence via contacts 2MA2 and 2MA4 connected over conductors of a direct path to bridge circuit 13 to await the subsequent connection of other conferees to that circuit. In a similar manner leads TI and RI to data set 3 are coupled via transformer 21 and contacts 2MA6 and 2MA8 over conductors of the direct path to bridge circuit 13. Idle circuit terminating resistor 32 of FIG. 2 is disconnected by contact 2MA1.

In the event our invention is used to establish a broadcast-type conference call, the wiring from contacts 2MA2 and 2MA4 to bridge circuit 13 is omitted and only the "receive" path to the data set is connected.

Relay 2BSY of FIG. 2 is operated from ground by contact 2MA10 for releasing the connection between port P2 and line circuit 4. Referring to lead S which is connected from line circuit 4 to the network switch appearance, contact 2BSY1 removes ground therefrom for releasing relay 6SLO of FIG. 6. This release path may be traced via the network path, lead OS of port P2, through FIGS. 3, 4, 5, to FIG. 6 and contact 6SLO6 to the winding of relay 6SLO6. Referring to FIG. 3, hold magnet 3THM10 is released by contact 6SLO1 and, accordingly, the link from port P2 to the subject line circuit through network 9 is released.

Relay 5TB of FIG. 5 is also released by the release of relay 6SLO for connecting relay 4IS of FIG. 4 once more across leads IT1 and ITR to monitor the supervisory signal from the originator line circuit. Specifically, the winding of relay 4IS is coupled by transformer 19 and contacts 60TB1, 60SA2, 60SA3, and 60TB8 to both leads ITT and ITR and operates from the ground supervisory signal if the originator is still connected. In turn, relay 6ISA of FIG. 6 is operated from ground through contact 4IS2 for transmitting a request for service signal to marker 12 which responds by establishing a connection from port P2 to an idle register circuit. As described hereinbefore, this request is transmitted by grounding leads TRO and UO to marker 12 which as disclosed in Abbott et al. establishes the dial tone connection.

The aforementioned tone transmitted to the originator for apprising him that the conferee is connected to bridge circuit 13 is disconnected from leads IRT and IRR by the release of relay 5TB at contact 5TB1 which disconnects the tone on lead F2S from tone supply circuit 32. Shortly thereafter, the dial tone from the register circuit connected to port P2 is coupled to the originator as previously described and the sequence may be repeated by dialing the code of the next conferee.

It should be further noted that when our invention is used to interconnect telephone station sets rather than data sets, a recorded announcement circuit may appropriately be connected to the multiple address bridge circuit for informing each connected conferee that he is connected to a conference circuit and that the originator will subsequently be also connected thereto.

IV. Connecting the Originator's Line Circuit to the Conference Connection

After the last desired conferee is connected to bridge circuit 13, an idle register circuit is again connected automatically to port P2 as described hereinbefore. Upon the receipt of dial tone, the originator dials a special transfer code which is received by the register circuit and translated therein. Referring to FIG. 20 of Abbott et al., terminals are shown which may be interconnected in various ways to screen certain called numbers. We add new terminals which may be strapped as shown in the portion of register circuit 10 disclosed in FIG. 6 to operate a newly added relay designated MAC in register circuit 10. Included as part of those register circuit cross-connections is a class-of-service relay CS contact which allows relay MAC to operate only when port P2 of control circuit 11 is connected to this register circuit. Operation of relay MAC connects ground to lead TB which may be traced from register circuit 10 to the winding of relay 60TB via contact 60TB15 for operating it.

Operated relay 60TB causes the connected register circuit to be released and a direct connection to be established from control circuit 11 to bridge circuit 13 over which the originator may communicate with the conferees connected to the latter circuit. In particular, with reference to FIG. 4 leads OTT and OTR are opened by contacts 60TB18 and 60TB19 and the register circuit connected over these leads releases because the L relay therein is released. See FIG. 18 of Abbott et al. The originator "transmit" path is connected to leads ITT and ITR via network 9 as previously described and it is extended directly to bridge circuit 13. Specifically, this extension path may be traced from leads ITT and ITR through contacts 60TB2 and 60TB7, transformer 19, contacts 60TB3 and 60TB5, amplifier MA and transformer 33 over leads MAR and MAT to bridge circuit 13. It is noted that in the instance a broadcast-type conference is desired the originator "receive" path is not connected. Otherwise, the secondary of transformer 20 is coupled to bridge circuit 13 via contacts 60TB22 and 60TB23 and over leads MBT and MBR to bridge circuit 13. In FIG. 4, there is an idle circuit terminating resistor 34 across the output of amplifier MA to maintain a balanced bridge circuit until the originator is connected. This is removed by contact 60TB20.

Referring now to FIG. 6, leads TRO and UO connected to marker 12 are opened by contact 60TB17 to prevent a false request for service signal from being transmitted. This is necessary because relay 4IS of FIG. 4 which is connected across leads ITT and ITR is operated by the calling supervisory signal and, in turn, relay 6ISA of FIG. 6 is also operated. The latter relay at contact 6ISA7 but for contact 60TB17 would connect ground to leads UO and TRO and thereby cause a false start signal to be sent to marker 12.

Following the release of register circuit L relay, ground is removed from the sleeve and the hold magnet at the port P2 side of the link is released. Specifically, the removal of ground from lead S removes it from lead OS of the port P2 switch appearance shown in FIG. 3 and, as a result, relay 6SL10 in FIG. 6 is released. Referring again to FIG. 3, hold magnet 3THM10 is released by contact 6SLO1.

V. Timing the Register Circuit Connection to Port P2 of Control Circuit 11

The period that the originator is connected to register circuit 10 via port P2 before the receipt of the full conferee address is received by register circuit 10 is timed in the latter circuit. If this interval exceeds approximately 8—16 seconds, a permanent signal tone is returned to the originator and register circuit 10 is released.

Assuming that the originator fails to dial the full conferee address within the prescribed time limits, register circuit 10 relay TMOR is operated as shown in FIG. 18 of Abbott et al. Referring now to FIG. 6, a contact of relay TMOR in register circuit 10 applies ground to lead PS and via contact 6PS10 for operating relay 6PS on its lower winding. Relay 6PS locks via its upper winding, and over contacts 6PS9 and 4IS3, lead IS which may be traced through FIGS. 5, 4 and 3, the operated link of network 9, the S lead of originator line circuit 2, and in FIG. 2 over contacts 2BSY1 and 2S1 to ground. Register circuit 10 releases automatically when relay TMOR operates.

Operated relay PS sends a permanent signal tone to the originator, opens the request for service leads (TRO and UO) to marker 12 shown in FIG. 6 at contact 6PS13 and opens lead ST of circuit 31 shown in FIG. 5 at contact 6PS7 to prevent it from timing out and operating relay 5TB. In particular, permanent signal tone circuit 33 of FIG. 4 is connected via contact 6PS2, capacitor 34, contacts 5TBL3 and 60TB21, transformer 20, and via leads IRT and IRR connected over the aforementioned link of network 9 to the originator line circuit.

If the originator desires to resume dialing conferee numbers, he opens the station loop momentarily releasing and reoperating supervisory relay 4IS in FIG. 4. Referring now to FIG. 6, the momentary release of the latter relay at contact 4IS3 opens the holding path for relay 6PS and it releases. Thereafter, in FIG. 6 a request for service signal is automatically transmitted to marker 12 on the release of contact 6PS13 and the originator may continue to add conferees or dial the transfer code and be switched to bridge 13 for the conference.

VI. Premature Disconnect by a Conferee Connected Directly to Bridge Circuit 13

If a conferee previously connected to bridge circuit 13 disconnects before the originator completes the establishment of the conference call, all conferees connected to bridge circuit 13 are signaled via that circuit and the originator is signaled via control circuit 11. Referring first to FIG. 2, let it be assumed that the connected conferee associated with that line circuit goes on-hook and accordingly relay 2SR is released by responsive circuitry of set 30 symbolically indicated by switch SW1. Referring to the bottom center of FIG. 2, a ground is transmitted on lead D directly to control circuit 11 via contacts 2MA11 and 2SR2, lead D which may be traced through FIGS. 3 and 4 to FIG. 5 and therein via contact 5TBL7 to the winding of relay 5CD. It is noted that relay 2MA of FIG. 2 is held operated by contact 2SR3 and therefore it releases shortly after the release of relay 2SR. Accordingly, the ground on lead D is removed a short time later and relay 5CD must be a quick operating relay. Relay 5CD is locked operated by contact 5CD1.

Relay 5CD prepares a path for operating relay 5TBL in FIG. 5. Contact 6SL02 in this operating path prevents the operation of relay 5TBL in the event the originator is setting up another conference connection at the time relay 5CD operates. When relay 6SLO releases indicating that the links connected to port P2 are released and that the originator is between connections, relay 5TBL is operated. The operating path may be traced from its winding, thermistor 35, and contacts 6SLO2 and 5CD2 to ground. Thermistor 35 delays the operation of relay 5TBL to allow sufficient time for other circuit 11 relays to release which were used to control the connection of the last conferee to bridge circuit 13.

Tone is connected to the originator and to the various connected conferees for indicating the release of the conferee from bridge circuit 13 by contacts of relay 5TBL. Specifically, tone supply circuit 32 of FIG. 4 generates a unique tone on lead F1S which is coupled via contacts 5TBL4 and 60TB21, transformer 20, leads IRT and IRR which may be traced through network 9 to the originator line circuit for indicating the premature release. In addition, the tone on lead F1S is also coupled to the connected conferees on bridge circuit 13. This tone path may be traced from lead F1S, via contacts 5TBL1, 6SLI3, and 60TB6, amplifier MA, transformer 33 and leads MAR and MAT to bridge circuit 13. Thereafter, the originator and all parties connected to the conference release. The release sequence follows the sequence described hereinafter under the heading "Release of the Conference connection."

It is noted that the operation of relay 5TB at contact 5TBL11 in FIG. 6 also opens leads TRO and UO to marker 12 for preventing the automatic transmission of subsequent "request for service" signals.

VII. Exceeding the Predetermined Number of Allowable Conferees

The number of conferees which can be included in single conference can be limited to any prescribed number. Referring to FIG. 5, this number is adjustable by varying the value of resistance 36 which shunts relay 5TA. Each line circuit that is connected to bridge circuit 13 connects a resistance ground to lead C. Each of these resistances is connected in parallel and when the effective parallel resistance of all connected line circuit resistors is low enough, the voltage drop across variable resistor 36 in series with resistor 38 is sufficient for operating sensitive relay 5TA. Specifically, with reference to FIG. 2 as shown at the bottom center, contacts 2MA11 and 2SR1 connect ground via resistor 37 to lead C.

Upon the operation of relay 5TA, a signal is transmitted directly to register circuit 10. Specifically, with reference to FIG. 6, contact 5TA1 grounds lead TA to register circuit 10. This ground is not effective in register circuit 10 unless the originator dials a code other than the transfer code such as for example the code of another conferee. In the latter case, register circuit 10 does not request a completing connection to the dialed conferees line circuit but instead register circuit relay BYR is operated, and at contact BYR1 returns a ground on lead PS to operate the 6PS relay via lead PS and contact 6PS10. Furthermore, register circuit 10 releases from the connection.

It is noted that relay BYR is added to register circuit 10 which is otherwise substantially identical to the dial pulse register circuit disclosed in Abbott et al. The operating path includes new contacts of existing relays d.c. and CS (class of service) and a contact MAC1 of newly added relay MAC. Relay d.c. operates at the end of pulsing and relay CS- is the class-of-service relay solely associated with port P2 of control circuit 11. If relay MAC is not operated at the end of pulsing (relay d.c. operated) the originator did not dial the transfer code and, accordingly, a path is closed for operating relay BYR.

As a result of the operation of the aforementioned relay 6PS tone supply circuit 32 in FIG. 4 is connected to the originator to indicate that too many conferee numbers have been dialed. Specifically, lead F1M of circuit 32 is connected via contacts 5TA2, 6PS13 and 60TB21, transformer 20 and thence via leads IRT and IRR and the established links in network 9 to the originator.

The originator can remove this tone and cause register circuit 10 to be connected to port P2 by momentarily depressing the switch hook for momentarily releasing relay 4IS and in turn 6PS. As described hereinbefore, this action causes a new connection from register circuit 10 to port P2 and thereafter the originator can dial the transfer code and be connected to bridge circuit 13.

VIII. Release of the Conference Connection

Each conferee independently disconnects from the conference bridge circuit 13 by restoring his data set receiver to on-hook. Referring to FIG. 2, this results in the release of relay 2SR and, in turn, relays 2MA and 2BSY for restoring the line circuit to normal. In like manner, the originator releases and, referring to FIG. 4, relay 4IS and its slave relay 6ISA shown in FIG. 6 release. Relay 6SLI of FIG. 6 releases before the release of relay 2SR in the originator line circuit 2 (FIG. 2) as a result of the removal of ground from lead E by the supervisory circuit of terminating set 30 shown in FIG. 2. In turn, relay 60TB of FIG. 6 releases and the originators direct connection from control circuit 11 to bridge circuit 13 is released.

After all the conferees have released, relay 5UK of FIG. 5 is released. Specifically with reference to FIG. 2, lead UK is opened in each line circuit upon the release of relay 2SR at contact 2SR1. Diode 38 is included in the aforementioned path to prevent circuit backups. Referring to FIG. 6, relay 6SLI releases thereafter and, accordingly, the port P1 hold magnet 3THM11 in FIG. 3 is released restoring control circuit 11 to normal.

Although not disclosed in detail in the present illustrative embodiment, numerous applications of the principles of the disclosed invention are deemed apparent in the light of this teaching such as, for example, providing a plurality of multiple address control circuits together with select and preference circuitry for simultaneously establishing a plurality of separate conference calls. Furthermore, it is considered apparent to furnish a call distribution system between the line circuits and the multiple address bridge circuit for interconnecting these circuits via concentrated access paths. Beyond these particular examples, numerous other arrangements may also be devised by those skilled in the art without departing from the spirit and scope of this invention.

We claim:

1. A communication switching system comprising:

a plurality of communication stations;

a switching network;

register means;

a multiport conference bridge circuit;

a line circuit for each of said stations, each line circuit having a first connection to a terminal of said network and a second connection to a port of said bridge circuit;

network control means; and a bridge control circuit having an input port and an output port connected to terminals of said network, said bridge control circuit including:

means responsive to establishment of a connection through said network from an originating station to said input port for causing said network control means to establish a connection to said register means from said output port;

means responsive to establishment of a connection through said network from said output port to a called line circuit for transmitting a control signal over said network connection to said line circuit to cause said line circuit to release said network connection and to enable said second connection to a port of said bridge circuit; and means responsive to a particular code in said register means for establishing a direct connection from said input port to a port of said bridge circuit.

2. A communication switching system in accordance with claim 1 wherein said bridge control circuit further includes means for returning a distinct tone to said originating station if said originating station attempts to add more than the allowed number of conferees to said bridge circuit.

3. A communication switching system in accordance with claim 1 wherein said switching network includes crossbar switch means, said connection from said originating station to said input port being held by a supervisory signal from said originating station and said network connection from said output port to said line circuit being held in response to said originating station supervisory signal and by said line circuit.

4. A communication switching system in accordance with claim 1 further including means for detecting the receipt of an answer signal generated by said called line circuit, means for timing for a predetermined period following detection of said answer signal, and wherein said transmitting means is controlled for transmitting said control signal at the cessation of the timed period.

5. In a conferencing arrangement adapted for controlling the interconnection of data sets directly to a multiport conference bridge circuit and thereby eliminating the necessity for establishing a plurality of individual call connections via a switching network, data line circuits for connecting individual ones of said data sets to said switching network and for also connecting said data sets to a prescribed port of said multiport conference bridge circuit, and each of said data line circuits comprise:

a. means for monitoring signals exchanged between said one data set and said network via said line circuit;

b. means responsive to the receipt of a control signal received via a network connection to said line circuit for controlling the release of the network connection; and c. means concurrently responsive to the receipt of said control signal for controlling apparatus of the line circuit to establish a direct connection to a prescribed port of said multiport conference bridge circuit.

6. A broadcast conferencing arrangement for a data switching system comprising a plurality of data terminal sets, a switching network for interconnecting said sets, a plurality of data line circuits associated with individual ones of said sets for connecting said sets to said network, a control circuit having two ports each being connected to said network, a register connected to said network, means responsive to a call origination for connecting a calling one of said sets via said network to said register, means responsive to the recording of a prescribed code in said register for connecting a first one of said control circuit ports via said network to said calling set and for connecting a second one of said control circuit ports via said network to said register, means responsive to the receipt of an address code for a called one of said sets in said register for extending a connection via said network from said second port to the called one of said data line circuits associated with said called set, means in said control circuit monitoring the connection to said called line circuit for detecting an answer signal, means responsive to the receipt of said answer signal for sending a control signal to said called line circuit a prescribed time interval after receiving said answer signal, a common conference bridge circuit being connectable to said line circuits, and means in said called line circuit responsive to the receipt of said control signal for disconnecting the network connection from said called line circuit to said second port and for connecting said called line circuit to said conference bridge circuit.